United States Patent
Feuerecker et al.

(10) Patent No.: US 8,607,855 B2
(45) Date of Patent: Dec. 17, 2013

(54) COOLING SYSTEM FOR A MOTOR VEHICLE

(75) Inventors: Günther Feuerecker, Stuttgart (DE); Karl Lochmahr, Vaihingen/Enz (DE); Frank Müller, Simmozheim (DE); Dirk Neumeister, Stuttgart (DE); Thomas Strauβ, Notzingen (DE); Marcus Weinbrenner, Gerlingen (DE); Richard Obradovich, Livonia, MI (US); Gunnar Schlinke, Troy, MI (US); Christophe Schmittheisler, Epfig (FR)

(73) Assignees: Behr GmbH & Co. KG, Stuttgart (DE); Behr America, Inc., Troy, MI (US); Behr France Rouffach SAS, Rouffach (FR)

( * ) Notice: Subject to any disclaimer, the term of this patent is extended or adjusted under 35 U.S.C. 154(b) by 924 days.

(21) Appl. No.: 12/035,678

(22) Filed: Feb. 22, 2008

(65) Prior Publication Data

US 2008/0202722 A1    Aug. 28, 2008

(30) Foreign Application Priority Data

Feb. 23, 2007  (EP) .................................. 07290241

(51) Int. Cl.
     *B60H 1/00*     (2006.01)
(52) U.S. Cl.
     USPC ............... 165/202; 165/42; 165/43; 165/240; 165/241; 237/2 A; 237/2 B; 237/12.3 B; 62/160; 62/201; 62/238.6; 62/238.7; 62/434; 62/435
(58) Field of Classification Search
     USPC .................. 165/202, 42, 43, 240, 241, 242; 237/2 A, 2 B, 12.3 B; 62/434, 435, 201, 62/238.6, 238.7, 160
     See application file for complete search history.

(56) References Cited

U.S. PATENT DOCUMENTS

| 4,493,193 | A  | * | 1/1985  | Fisher ............................... 62/160 |
| 6,047,770 | A  | * | 4/2000  | Suzuki et al. ................. 165/202 |
| 2005/0178523 | A1 | * | 8/2005  | Itoh et al. ...................... 165/202 |
| 2005/0224221 | A1 |   | 10/2005 | Feuerecker et al. |
| 2006/0080985 | A1 |   | 4/2006  | Inaba et al. |

FOREIGN PATENT DOCUMENTS

| DE | 39 07 201 A1 | 9/1990 |
| DE | 101 42 740 A1 | 3/2003 |
| DE | 101 49 757 A1 | 4/2003 |
| DE | 102 25 055 A1 | 12/2003 |
| JP | 04148166 A * | 5/1992 |

* cited by examiner

*Primary Examiner* — John Ford
(74) *Attorney, Agent, or Firm* — Foley & Lardner LLP (57) ABSTRACT

The invention relates to an air-conditioning system for a motor-driven vehicle, having a refrigerant circuit (20) with a plurality of heat exchangers (4, 24) through which a refrigerant can be conducted for an exchange of heat with the air which flows through them, with it being possible for the heat exchangers (4, 24) to be operated as heaters or as evaporators as a function of the operating state of the air-conditioning system, and at least one third heat exchanger (16) is provided in the refrigerant circuit (20), which third heat exchanger (16) serves for an exchange of heat with a coolant circuit (13) which is formed separately from the refrigerant circuit (20). The vehicle can be both a motor vehicle and also a fuel-cell-driven vehicle.

8 Claims, 6 Drawing Sheets

COOLING SYSTEM FOR A MOTOR VEHICLE

The invention relates to an air-conditioning system for a vehicle.

In order to reduce the energy consumption of vehicles, in particular of motor vehicles, and to save energy, heat pump systems are used in air-conditioning systems of low-consumption vehicles. Many heat pumps utilize the ambient air as a heat source. Since ambient heat is utilized here for heating, such systems can have an advantageous level of energy consumption.

Many of said heat pumps additionally utilize the evaporator, which cools the cabin supply air in the cooling mode, as a heater, which heats the cabin supply air in the heating mode. This however has the disadvantage that condensation water is precipitated at the evaporator/heater during cooling and dehumidifying. If said moist evaporator is used for heating, fogging of the plates occurs (flash fogging) which must imperatively be avoided for safety reasons. Such a configuration, in which heating and cooling take place in close succession in terms of time, often occurs in the climatic transitional period in spring and autumn.

This is reliably remedied without restrictions by the addition of a further heat exchanger in the supply air flow, which is used only for heating, while the evaporator is used only for cooling and dehumidifying, as is described for example in DE 39 07 201. Said circuit variant has however proven to be technically complex with regard to the circuit arrangement of the refrigerant circuit and overcoming the refrigerant accumulations in the system.

DE 101 49 757 A1 describes a method for plate-fogging-preventing heat pump power regulation of a vehicle air-conditioning system which can be operated selectively in the cooling mode and heat pump mode and which has a heat exchanger which can be operated as an evaporator for air flow cooling in the cooling operating mode and as a condenser/gas cooler for air flow heating in the heat pump mode. Here, a refrigerant circuit having a pump, having a 4/2 directional control valve for flow direction reversal, having a first heat exchanger, having an expansion element, having a second heat exchanger and having an accumulator is provided. One of the heat exchangers is arranged in an external air flow, and the second heat exchanger is arranged in the air flow which is to be supplied to the vehicle interior space and in which is also arranged a heater which is traversed by engine coolant. However, power regulation in the event of danger as a result of plate fogging leads to noticeable losses of comfort. This concept is therefore not sufficient as a single source for vehicle heating for vehicle drives which provide insufficient heat over a long period of time.

A disadvantage of the heat pump systems which use ambient air as a heat source is the increasing blockage of the ambient heat exchanger by the deposition of frost (so-called icing of the ambient heat exchanger). This restricts the service life of the heat pump.

A further disadvantage of the heat pump systems which use ambient air as a heat source is the decrease in the possible heating power under falling ambient temperatures, which contradicts the heating power demand. This has the result that a heat pump system must be of very large and expensive design in order to be able to provide sufficient heating power even under the rare, extremely cold climate conditions. On account of the pressures which occur in the refrigerant circuit during operation, there are additionally restrictions in the selection of possible refrigerants of the heat pump circuit.

DE 102 25 055 A1 discloses an air-conditioning system for a motor vehicle, having a refrigerant circuit with a plurality of heat exchangers through which a refrigerant can be conducted, and with a coolant circuit, with one heat exchanger serving for the exchange of heat between the refrigerant and coolant. Here, two heaters are provided in the heating mode; one is part of the refrigerant circuit, the other is part of the coolant circuit, with the heater of the coolant circuit being arranged between the heat exchangers of the refrigerant circuit. Individual regions of the refrigerant circuit are not traversed by flow under certain operating conditions. From said regions of the refrigerant circuit which are not required, refrigerant recirculation is provided into those regions which are active in the corresponding mode. This concept however demands the constant availability of a heat source, which is not the case in fuel-cell vehicles or range-extender hybrid vehicles.

It is an object of the invention to provide an improved air-conditioning system. Said air-conditioning system should firstly provide a heat pump system for the energy-efficient provision of heating heat, and should secondly ensure that the demands for comfort and safety are met. The heat pump system should also be dimensioned cost-effectively.

According to the invention, an air-conditioning system for a motor-driven, in particular electric-motor-driven vehicle, is provided with a refrigerant circuit with a plurality of heat exchangers through which a refrigerant can be conducted for an exchange of heat with the air which flows through them, with it being possible for the heat exchangers to be operated as heaters or as evaporators as a function of the operating state of the air-conditioning system, and at least one third heat exchanger is provided in the refrigerant circuit, which third heat exchanger serves for an exchange of heat with a coolant circuit which is formed separately from the refrigerant circuit. The provision of a further heat exchanger in the refrigerant circuit increases the efficiency of the refrigerant circuit.

The refrigerant circuit preferably has a flow direction reversal for the refrigerant in at least a region of the refrigerant circuit in which the three heat exchangers are arranged. The direction reversal can be provided in a simple manner by means of a 4/2 directional control valve, with a part of the refrigerant circuit in which the pump and an accumulator are arranged always being traversed by flow in the same direction, while the other part of the refrigerant circuit, in which the at least three heat exchangers and at least one expansion element are arranged, can be traversed by flow as a function of the desired operating mode.

It is preferable that, in the refrigerant circuit, two of the heat exchangers are arranged in series and are separated from the third heat exchanger by an expansion element, with firstly an ambient heat exchanger and subsequently a coolant/refrigerant heat exchanger being traversed by refrigerant in a heating mode in order to absorb heat from the environment and from the coolant. Such an arrangement makes it possible for the maximum power of the ambient heat exchanger to be reduced, as a result of which the risk of icing is reduced, which in turn extends the possible service life in a heat pump cycle.

Preferably two coolant circuits are provided, which are circulated in each case by a pump, with it being possible for the two circuits to be connected to one another such that an exchange of coolant takes place. A configuration of said type permits the utilization of different heat sources, such as ambient air and waste air. In addition, it is possible for the waste heat of the cooling circuit to be used for a reheat mode. For this purpose, particularly preferably in the connected state of the coolant circuits, a heater which serves to heat the air which passes from the evaporator and which is to be supplied to the vehicle interior space, and the heat exchanger which serves for the exchange of heat with the coolant, can be traversed by coolant, with heat being conducted from the refrigerant circuit to the heater.

It is preferable that, in a normal cooling mode, the coolant/refrigerant heat exchanger dissipates heat to the coolant, which itself dissipates the absorbed heat, via a waste air heat exchanger arranged in the cooling circuit, to the environment.

A reheat mode is preferably possible, in which the air which passes from the refrigerant-cooled evaporator and which is to be supplied to the vehicle interior space is re-heated, with the coolant/refrigerant heat exchanger dissipating heat to the coolant, which itself dissipates the absorbed heat, via a heater in a cooling circuit, to the air which is to be supplied to the vehicle interior space.

A second type of reheat mode is particularly preferably possible, in which the air which passes from the refrigerant-cooled evaporator and which is to be supplied to the vehicle interior space is re-heated, with the coolant/refrigerant heat exchanger dissipating heat to the coolant, which itself dissipates the absorbed heat, via a waste air heat exchanger arranged in the cooling circuit, to the environment, and the air which is to be supplied to the vehicle interior space is heated by means of a heater which is arranged in a separate cooling circuit and uses the waste heat of another component, in particular of an internal combustion engine or of a fuel cell.

It is preferable that, in the heat pump heating mode, heat from the environment is absorbed via a waste air heat exchanger arranged in the cooling circuit, which heat is conducted by means of the coolant to the coolant/refrigerant heat exchanger and is dissipated to the refrigerant.

It is preferable for a conventional heating system to additionally be provided, for example an electric PTC heater for the cabin supply air or an electric or fuel-operated auxiliary heater for the coolant. Said conventional heating system is capable of ensuring the heating of the cabin and also ensuring that the plates are free from icing and fogging if the operation of the heat pump is not economical on account of low temperatures or is not possible on account of restrictions (flash fogging, ambient heat exchanger icing).

The invention is explained in more detail below on the basis of an exemplary embodiment and with reference to the drawing, in which.

FIGS. 1 to 5 show an arrangement of various coolant and refrigerant circuits which are part of a motor vehicle air-conditioning system 1 and which contribute at least indirectly to the temperature control of the vehicle interior space. Provided for the temperature control of the vehicle interior space are an electrically operable PTC heater 2, a heater 3 and a heat exchanger which can be operated both as an evaporator and also as a heat pump heater, referred to below as an interior space heat exchanger 4.

The heater 3 is arranged in each case in a first cooling circuit 6 which can be circulated by a first pump 5, with it being possible for the circuit, in the normal heating mode, that is to say when the internal combustion engine 7 is running and heat is provided via the engine waste heat transported by the coolant, to be switched in such a way that the first pump 5 feeds the coolant to the internal combustion engine and subsequently to the heater 3. Said circuit is (as is also the case in conventional vehicles) part of the motor cooling circuit, which also comprises inter alia a thermostat valve and a cooler which dissipates unusable waste heat to the environment. Said part of the cooling circuit is not specifically illustrated since its design is not essential to the invention.

Figure 6:
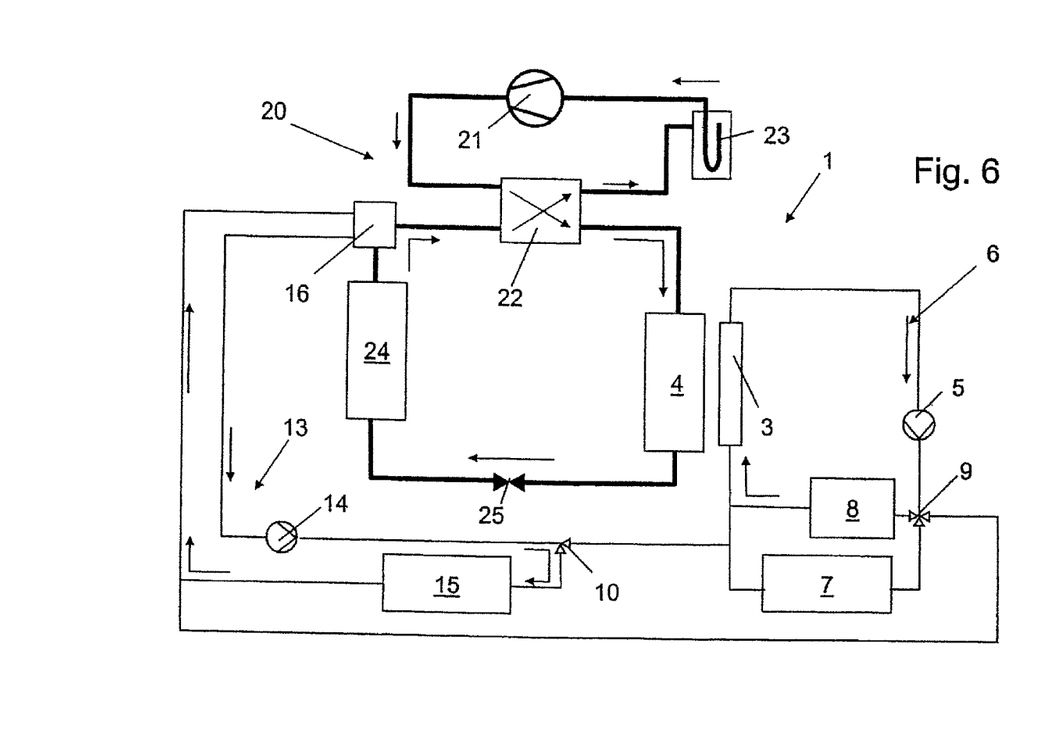
FIG. 6 shows the coolant and refrigerant circuits from FIG. 1 in the heat pump heating mode utilizing a coolant-side auxiliary heater provided according to one variant.

FIG. 6 illustrates a variant according to which an auxiliary heater 8 is arranged parallel to the internal combustion engine 7 instead of the PTC heater 2. This variant will be explained in more detail further below.

The first cooling circuit 6 can be directly connected via connecting lines 11 and 12, which can be regulated by means of valves 9 and 10, to a second circuit 13, with a second pump 14, a waste air heat exchanger 15 and a coolant/refrigerant heat exchanger 16 being arranged in the second cooling circuit 13. The first connecting line 11 from the first cooling circuit 6 to the second cooling circuit 13 branches off from the first cooling circuit 6 downstream of the first pump 5, with the first valve 9 being arranged at the branch and opening out into the second cooling circuit 13 downstream of the waste air heat exchanger 15 and upstream of the coolant/refrigerant heat exchanger 16. The second connecting line 12 branches off from the cooling circuit 13 downstream of the second pump 14, with the second valve 10 being arranged at the branch and opening out into the first cooling circuit 6 downstream of the internal combustion engine 7 and upstream of the heater 3. By means of the two valves 9, and the connecting lines 11, 13, it is therefore possible for the waste air heat exchanger 15 and the internal combustion engine 7 (and the auxiliary heater 8) to be bypassed. An exchange of coolant between the two cooling circuits 6 and 13 is also possible.

Also provided, as can be seen from the drawing, is a heat pump refrigerant circuit 20 which is illustrated with greater line thickness, with the refrigerant being circulated by a refrigerant compressor 21. As a result of the provision of a 4/2 directional control valve 22, it is possible for the refrigerant to flow through one part of the refrigerant circuit 20 in both directions, depending on the position of the valve 22. As viewed in the flow direction of the refrigerant, an accumulator 23 is arranged in the pump section of the refrigerant circuit 20 upstream of the refrigerant compressor 21. Arranged in the other section of the refrigerant circuit 20 are said coolant/refrigerant heat exchanger 16, an ambient heat exchanger 24, an expansion element 25 and said interior space heat exchanger 4.

The function of the air-conditioning system 1 is explained in more detail below on the basis of various operating states.

Figure 1:
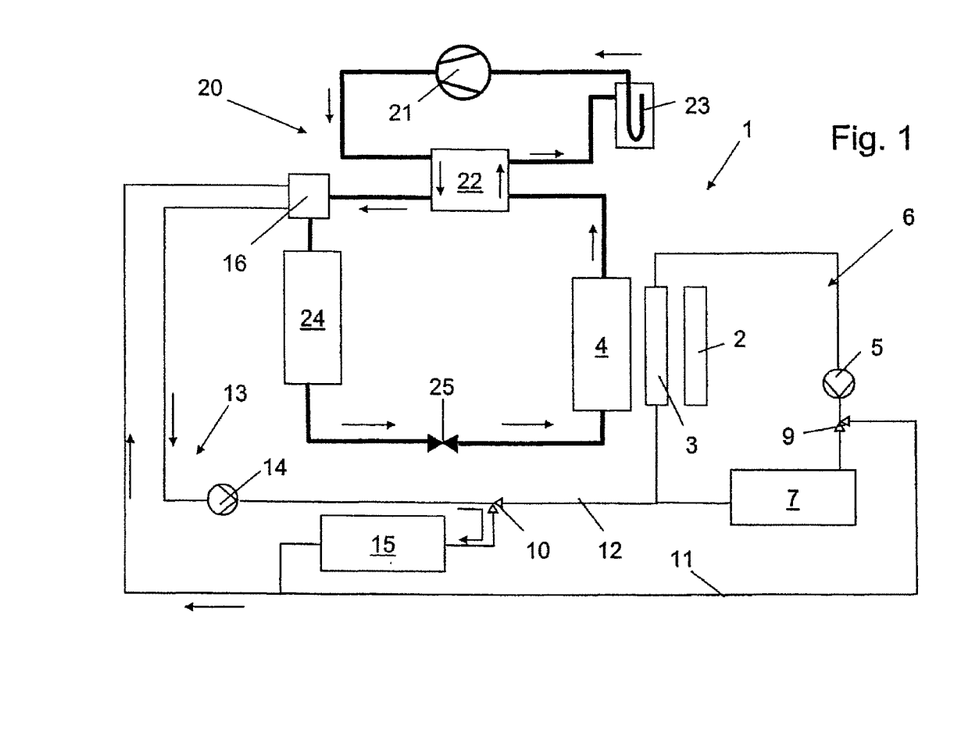
FIG. 1 is a schematic illustration of the coolant and refrigerant circuits of an air-conditioning system as per the exemplary embodiment in the cooling mode.

FIG. 1 shows the cooling mode of the air-conditioning system 1 when the internal combustion engine 7 is at a standstill. Here, the first cooling circuit 6 is not traversed by flow, that is to say no heat is transported from the internal combustion engine 7 to the heater 3. The refrigerant circuit 20 is circulated by the refrigerant compressor 21, with the 4/2 directional control valve 22 being set such that the refrigerant flows from the compressor to the coolant/refrigerant heat exchanger 16, then to the ambient heat exchanger 24, to the expansion element 25, to the interior space heat exchanger 4, to the accumulator 23 and back to the refrigerant compressor 21.

The heat which is absorbed by the interior space heat exchanger 4, which operates in this case as an evaporator, that is to say which cools the air which flows through it, is transported in the refrigerant circuit 20 to the coolant/refrigerant heat exchanger 16 and partially to the coolant which is circulated in the second cooling circuit 13. Here, the coolant/refrigerant heat exchanger 16 acts as a waste heater and if appropriate as a condenser in which the refrigerant is, under corresponding operating conditions, cooled to the dew point and (partially) condensed. A further cooling stage is formed by the subsequent ambient heat exchanger 24, via which heat is likewise dissipated, in this case to the environment. The waste heat which is absorbed via the coolant/refrigerant heat exchanger 16 from the second cooling circuit 13 is itself dissipated via the waste air heat exchanger 15 to the environment, so that—as a result of the multi-stage dissipation of heat—the power and the efficiency of the air-conditioning system 1 are improved.

Figure 2:
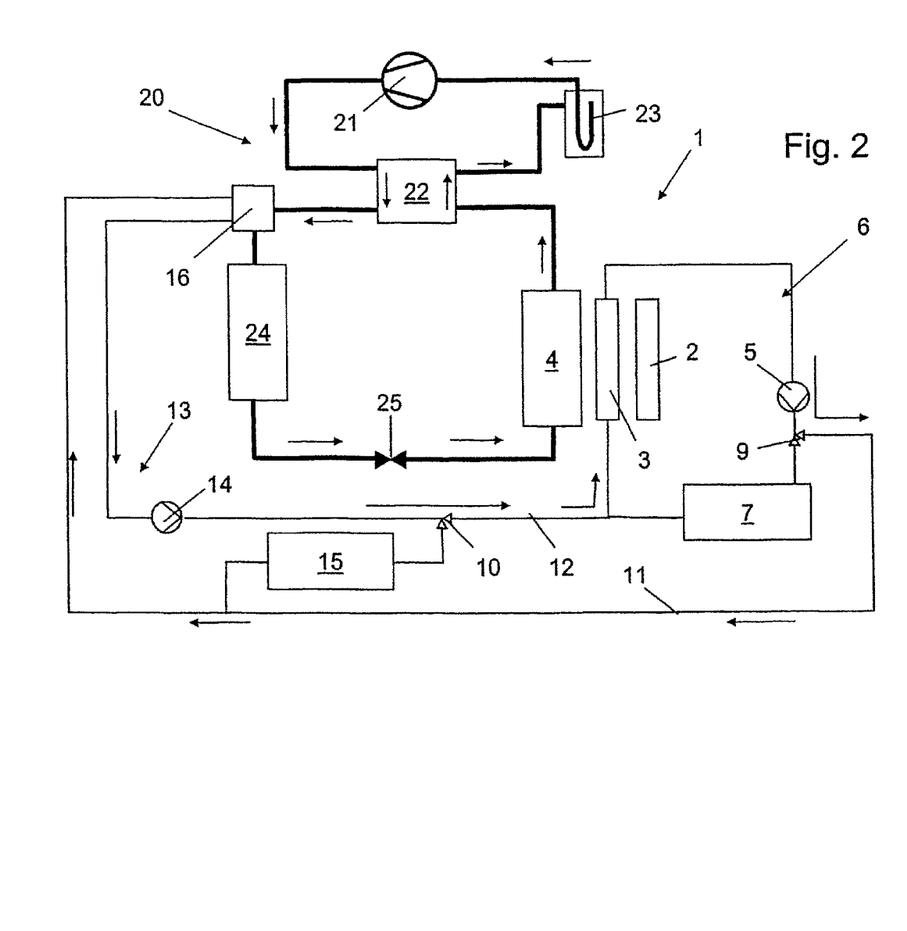
FIG. 2 shows the coolant and refrigerant circuits from FIG. 1 in the cooling mode with a reheat mode (waste heat refrigeration circuit)

FIG. 2 shows the cooling mode with a reheat mode, with the waste heat of the refrigeration circuit being used in the present case to reheat the cold, dehumidified air which has flowed through the interior space heat exchanger 4 which acts as an evaporator. Here, the internal combustion engine 7 is again not in operation. The function of the heat pump refrigerant circuit 20 corresponds to the function described above, and this is therefore not discussed in any more detail here.

As can be seen from the drawing, in this mode, the two cooling circuits 6 and 13 are connected to one another, that is to say the two valves 9 and 10 are open in the direction of the connecting lines 11 and 12. The coolant is circulated by the two pumps 5 and 14. Said coolant passes, proceeding from the first pump 5, the connecting line 11 to the coolant/refrigerant heat exchanger 16, to the second pump 14, to the heater 3 and back to the first pump 5. Here, the coolant absorbs heat from the refrigerant in the coolant/refrigerant heat exchanger 16, which heat serves to heat the air which flows through the heater 3, passes from the interior space heat exchanger 4 which operates as an evaporator, and is to be supplied to the vehicle interior space. The waste heat of the (connected) refrigerant circuit is therefore used to reheat the cold, dehumidified air.

Figure 3:
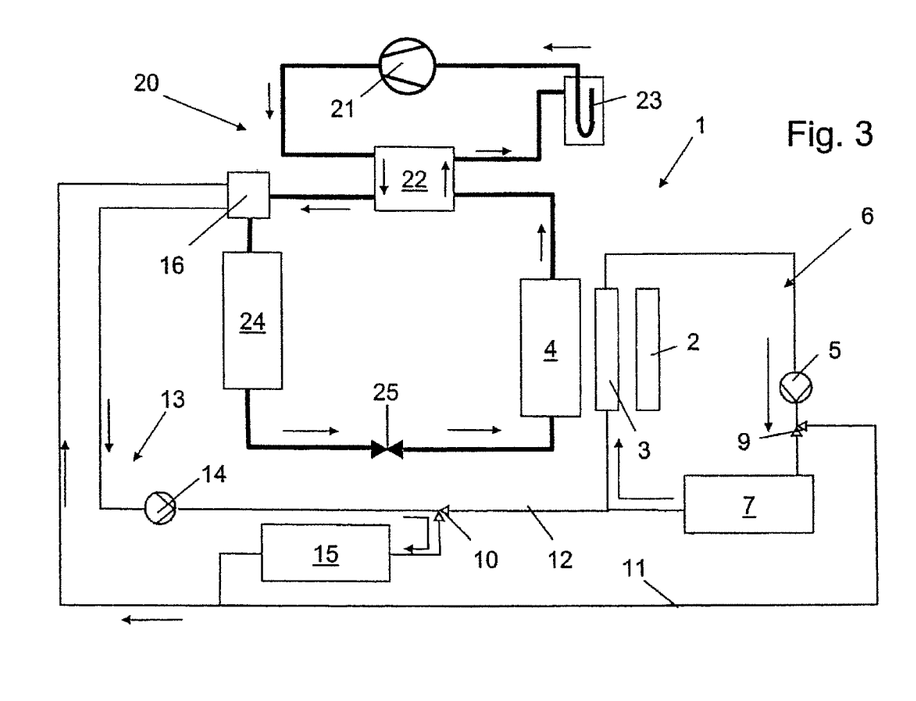
FIG. 3 shows the coolant and refrigerant circuits from FIG. 1 in the cooling mode with a reheat mode (waste heat of the internal combustion engine or fuel cell system)

FIG. 3 shows the cooling mode with a reheat mode, with the waste heat of the first cooling circuit 6 being used in the present case to reheat the cold, dehumidified air which has flowed through the interior space heat exchanger 4 which acts as an evaporator. Here, in contrast to the mode illustrated in FIG. 2, the internal combustion engine 7 is running and the coolant is warm enough to heat the air. The function of the heat pump refrigerant circuit 20 corresponds to the function described above with reference to FIG. 1, and this is therefore not discussed in any more detail.

In contrast to the reheat mode described above, when the internal combustion engine 7 is running and the coolant in the first cooling circuit 6 is sufficiently warm, the motor waste heat is used for reheating the air. The second cooling circuit 13 is, in this mode, separated from the first cooling circuit 6 and is operated—circulated by the second pump 14—in such a way that the coolant which absorbs waste heat from the refrigerant in the coolant/refrigerant heat exchanger 16 dissipates the absorbed waste heat to the environment via the waste air heat exchanger 15. The second cooling circuit 13 therefore serves in this mode to increase the efficiency of the refrigerant circuit 20.

Figure 4:
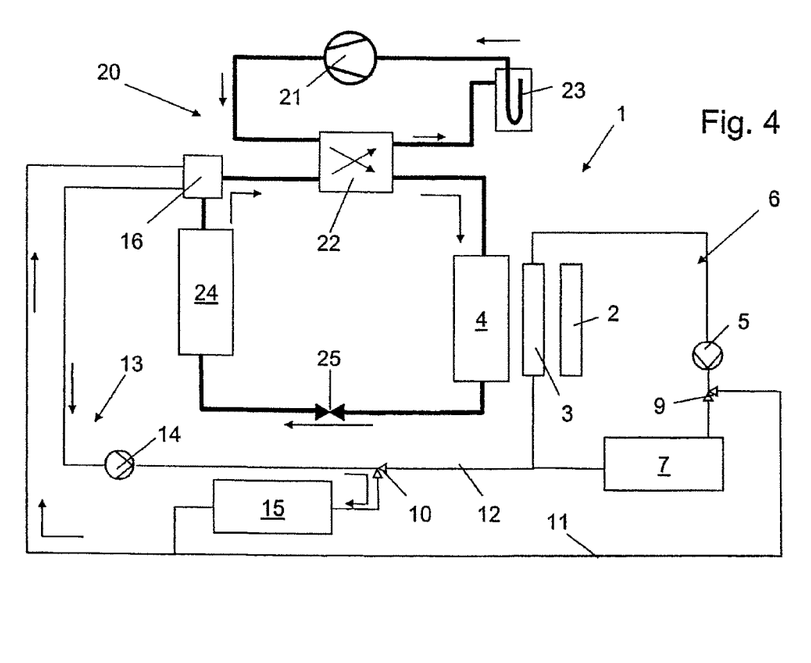
FIG. 4 shows the coolant and refrigerant circuits from FIG. 1 in the heat pump heating mode.

According to the mode illustrated in FIG. 4, a heating mode when the internal combustion engine 7 is at a standstill is provided, that is to say the interior space heat exchanger 4 which has hitherto been utilized as an evaporator is in this mode used as a heater for heating the air which is to be supplied to the vehicle interior space.

The heat pump refrigerant circuit 20 is, in the heat exchanging section, traversed by flow in the opposite sequence as a result of the changed position of the 4/2 directional control valve 22, that is to say the refrigerant passing from the refrigerant compressor 21 flows firstly through the interior space heat exchanger 4, then the expansion element 25, the ambient heat exchanger 24, the coolant/refrigerant heat exchanger 16 and the accumulator 23 before passing to the refrigerant compressor 21 again. In addition, in the second cooling circuit 13, the coolant is circulated by the second pump 14, with said coolant absorbing heat from the environment in the waste air heat exchanger 15 and transporting said heat to the coolant/refrigerant heat exchanger 16.

Since the refrigerant of the heat pump refrigerant circuit 20 is cooled as a result of the expansion through the expansion element 25, said refrigerant absorbs heat (for example from the waste air of the vehicle interior space and/or if appropriate of further existing heat sources) from the environment via the ambient heat exchanger 24 and heat of the warmer coolant from the second cooling circuit via the coolant/refrigerant heat exchanger 16 arranged downstream. As a result of the subsequent pressure increase by means of the refrigerant compressor 21, the refrigerant reaches a high enough temperature that it can dissipate heat to the air flowing through the interior space heat exchanger 4, and can therefore be used for heating purposes.

As a result of the fact that two successive heat exchangers 24 and 16 are arranged in series in the heat pump refrigerant circuit 20, it is possible for the power of the individual heat exchangers to be reduced. The heat which is absorbed in the ambient heat exchanger 24 is therefore reduced, as a result of which icing of the ambient heat exchanger 24 in said operating state is advantageously slowed or eliminated entirely. In addition, as a result of the lower power to be transmitted, the suction pressure increases, which is advantageous with regard to the efficiency of the heat pump refrigerant circuit 20.

Figure 5:
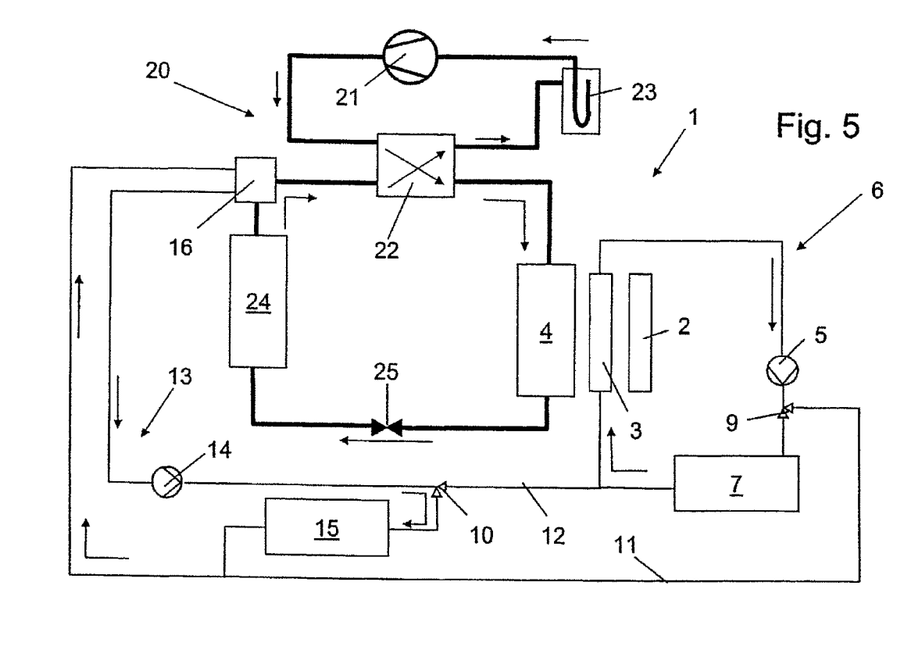
FIG. 5 shows the coolant and refrigerant circuits from FIG. 1 in the heat pump heating mode utilizing the motor waste heat.

FIG. 5 shows a heating mode of the air-conditioning system, with the motor waste heat of the internal combustion engine 7 being utilized for heating. In this case—in addition to the heater 3—corresponding to the mode illustrated in FIG. 4, the heat of the environment is used for heating purposes, for which purpose the refrigerant circuit 20 and the second cooling circuit 13 are traversed by flow as described above. Since the interior space heat exchanger 4 is arranged at the air approach flow side of the heater 3, said interior space heat exchanger 4 pre-heats the air, as a result of which the overall heating power can be improved.

Alternatively to an internal combustion engine 7, it is also possible for a fuel cell to be arranged at the corresponding point, the waste heat of which can be utilized by means of the coolant. Also possible are of course corresponding embodiments with combinations of internal combustion engine/fuel cell, the waste heat of which can be used for heating by means of a common cooling circuit or if appropriate also separately-formed cooling circuits.

The heat pump refrigerant circuit 20 need not however be circulated under all operating conditions. In particular when the ambient heat exchanger 24 is iced up or when there is the risk of flash fogging, it is possible for heating to be carried out by means of the conventional PTC heater 2 until more suitable operating conditions are obtained and a switch can be made back to an energy-optimized mode of the air-conditioning system 1.

An air-conditioning system according to the invention makes it possible for the heat pump system to be designed to be of an economical size, and the lack of power under extreme operating conditions can be taken over by means of an auxiliary heating system.

In order to prevent flash fogging and to nevertheless permit the fastest possible heat pump operation, the heat pump power can take place corresponding to DE 101 49 757 A1 or DE 101 42 740 A1, so that the evaporator is dried as quickly as possible and the risk of flash fogging is therefore eliminated.

FIG. 6 shows a variant of the air-conditioning system according to which a heater 8 is arranged in the refrigerant circuit parallel to the internal combustion engine 7, which heater 8 can be used for heating the coolant. In this case, the PTC heater is dispensed with, the function of which is taken over by the heater 8. Here, however, circulation of the coolant by means of the first pump 5 is additionally necessary, which can be dispensed with in the case of a PTC heater arranged directly in the air flow.

It is additionally possible for the heat of further waste heat sources, such as for example the waste heat of the electric motor or generator or of the power electronics, to be coupled into the first or second cooling circuit. The coupling-in takes place according to the operating temperature level for utilization in the reheat mode or as a heat source in the heat pump mode (first cooling circuit, or for heating the cabin or preheating the internal combustion engine in the second cooling circuit). By coupling said heat into the second cooling circuit 13, it is additionally possible for the waste heat, if it is not required, to be dissipated to the environment in the waste air heat exchanger 15.

The entire cooling circuit is illustrated only incompletely in order to highlight the essential aspects of the invention. Depending on the physical application, it can be necessary to position the pumps at some other point, to add further fittings such as valves or compensating tanks, or for example to connect the auxiliary heater 8 into the overall cooling circuit in some other way in order, if appropriate, to permit preheating of the internal combustion engine or of the fuel cell system.

The invention claimed is:

1. An air-conditioning system for a motor-driven vehicle, comprising:
   a first coolant circuit that includes a first pump and is configured to cool an engine,
   a second coolant circuit that includes a coolant/refrigerant heat exchanger, a second pump, and a waste heat exchanger, wherein the second coolant circuit is further configured to be either separate from or connected to the first coolant circuit depending on a state of a first valve and a state of a second valve, and
   a refrigerant circuit that includes a plurality of heat exchangers configured to conduct a refrigerant for an exchange of heat with air flowing through the plurality of heat exchangers of the refrigerant circuit and configured to operate as heaters or as evaporators as a function of an operating state of the air-conditioning system,
   wherein the plurality of heat exchangers of the refrigerant circuit include an interior space heat exchanger, an ambient heat exchanger and the coolant/refrigerant heat exchanger that is configured to exchange heat with the second coolant circuit, and
   wherein the refrigerant circuit further includes a compressor, and wherein the ambient heat exchanger and the coolant/refrigerant heat exchanger are arranged in series in the refrigerant circuit and are separated from the interior space heat exchanger by an expansion element such that, during a heat operation and in order to absorb heat from the surroundings, refrigerant flows from the compressor, then through the interior space heat exchanger, then through the expansion element, then through the ambient air heat exchanger, and then through the coolant/refrigerant heat exchanger.

2. The air-conditioning system as claimed in claim 1, wherein the refrigerant circuit provides a flow direction reversal for the refrigerant in at least a region of the refrigerant circuit in which the ambient heat exchanger, the coolant/refrigerant heat exchanger and the interior space heat exchanger are arranged.

3. The air-conditioning system as claimed in claim 1, wherein the first coolant circuit is configured to connect to the second coolant circuit such that an exchange of coolant takes place between the first and second coolant circuits.

4. The air-conditioning system as claimed in claim 3, wherein, when the first coolant circuit connects to the second coolant circuit, coolant is configured to flow through a heater that heats the air which passes from the interior space heat exchanger, wherein the heated air is configured to be supplied to an interior space of the vehicle, and wherein the coolant/refrigerator heat exchanger, which serves for the exchange of heat with the second coolant circuit, is configured to be traversed by the coolant, and wherein heat is conducted from the refrigerant circuit to the heater.

5. A method for operating the air-conditioning system as claimed in claim 1, comprising exchanging heat of the refrigerant circuit with the second coolant circuit using the coolant/refrigerant heat exchanger, wherein a heat pumping mode comprises absorbing heat from at least one of cabin waste air and waste heat generated in the vehicle using the waste heat exchanger arranged in the second coolant circuit, conducting the waste heat using coolant to the coolant/refrigerant heat exchanger, and dissipating the heat to the refrigerant in the refrigerant circuit.

6. The method as claimed in claim 5, wherein a cooling mode of the air conditioning system comprises:
   dissipating heat from the coolant/refrigerant heat exchanger to the coolant as absorbed heat; and
   dissipating the absorbed heat, using the waste heat exchanger that is arranged in the second coolant circuit, to the environment.

7. The method as claimed in claim 5, wherein a reheat mode of the air conditioning system comprises reheating air that passes from the interior space heat exchanger and is supplied to an interior space of the vehicle by dissipating heat from the coolant/refrigerant heat exchanger to the coolant as absorbed heat and dissipating the absorbed heat via a heater in the first coolant circuit to the air supplied to the interior space.

8. The method as claimed in claim 5, wherein a reheat mode of the air conditioning system comprises:
   reheating air that passes from the interior space heat exchanger and is supplied to an interior space of the vehicle by heat from the coolant/refrigerant heat exchanger to the coolant as absorbed heat,
   dissipating the absorbed heat via the waste heat exchanger arranged in the second coolant circuit to the environment; and
   heating the air supplied to the interior space with a heater that is arranged in the first coolant circuit and uses waste heat of the engine.

* * * * *